US012429997B2

(12) United States Patent
Garg et al.

(10) Patent No.: US 12,429,997 B2
(45) Date of Patent: Sep. 30, 2025

(54) AGE PREDICTION OF END USERS BASED ON INPUT DEVICE DATA

(71) Applicant: SardineAI Corp., Miami, FL (US)

(72) Inventors: Chandan Garg, Boston, MA (US); Zehao Xu, Toronto (CA); Jeffrie Joshua Lazarus George, Georgetown, TX (US); Srikant Rao, Pioneer, CA (US); Andrew Tausz, Toronto (CA)

(73) Assignee: SardineAI Corp., Miami, FL (US)

( * ) Notice: Subject to any disclaimer, the term of this patent is extended or adjusted under 35 U.S.C. 154(b) by 0 days.

(21) Appl. No.: 18/653,926

(22) Filed: May 2, 2024

(65) Prior Publication Data

US 2024/0281106 A1 Aug. 22, 2024

Related U.S. Application Data

(63) Continuation of application No. 18/082,451, filed on Dec. 15, 2022, now Pat. No. 12,001,643.

(51) Int. Cl.

| | |
|---|---|
| ***G06F 21/31*** | (2013.01) |
| ***G06F 3/04812*** | (2022.01) |
| ***G06F 11/34*** | (2006.01) |

(52) U.S. Cl.
CPC ...... *G06F 3/04812* (2013.01); *G06F 11/3438* (2013.01)

(58) Field of Classification Search
None
See application file for complete search history.

(56) References Cited

U.S. PATENT DOCUMENTS

2018/0349583 A1* 12/2018 Turgeman .......... H04L 63/0861

* cited by examiner

*Primary Examiner* — Carl Adams
(74) *Attorney, Agent, or Firm* — Polsinelli PC

(57) ABSTRACT

The present technology includes receiving event data of a user from a user device while the user interacts with a graphical user interface (GUI) to access a service, where the event data includes behavioral biometrics of the user obtained from one or more input devices of the user device, and predicting, based on the event data, a projected age of the user, where predicting the age of the user includes inputting the event data into a machine learning model, where the machine learning model is configured to receive event data and output an age prediction for a user associated with the event data.

20 Claims, 8 Drawing Sheets

100
Subject Entity 106
Access Device 102
Webpage / App 118
Transaction/ Response
Partner Web Service 116
Account Database 122
Third-Party Database 114
Subject Evaluation Service 124
API 110
Subject Entity Database 104
Events Database 108
ML Service 112
Partner Link Service 120

AGE PREDICTION OF END USERS BASED ON INPUT DEVICE DATA

CROSS-REFERENCE TO RELATED APPLICATIONS

This application is a continuation and claims the benefit of U.S. patent application Ser. No. 18/082,451, filed on Dec. 15, 2022, entitled "AGE PREDICTION OF END USERS BASED ON INPUT DEVICE DATA," which is expressly incorporated by reference herein in its entirety.

TECHNICAL FIELD

The present technology pertains to predicting an age of an end user and, more particularly to, predicting a projected age of the end user based on event data obtained while the end user interacts with a graphical user interface of a service.

BACKGROUND

Interactions between people are based on knowledge of who each party is. In physical interactions, people can verify the identity of another person. More specifically, people can utilize various different senses to determine whether the other person is who they say they are. For example, the person can look at a driver's license, ask specific questions, hear the person's voice, etc. Even if one cannot fully determine if the person is who they say they are, people can at least have a general idea of the actual person they are interacting with.

This contrasts with the digital world, where we have little insight into who is truly behind an avatar or an account. As the world becomes increasingly involved with the digital world, users are more frequently performing interactions online. For example, users regularly fill out forms online for various reasons. As another example, users post content or posts on social media networks. Furthermore, users may utilize a variety of different types of devices to access these different services. For example, users use computers, mobile phones, tablets, etc.

When users interact online, service providers and other people are not able to ascertain a true identity of the user. For example, a user signing up online for an account with a clothing retail store may potentially provide a different or false identity. The clothing retail store has no way to determine whether the information provided is true.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
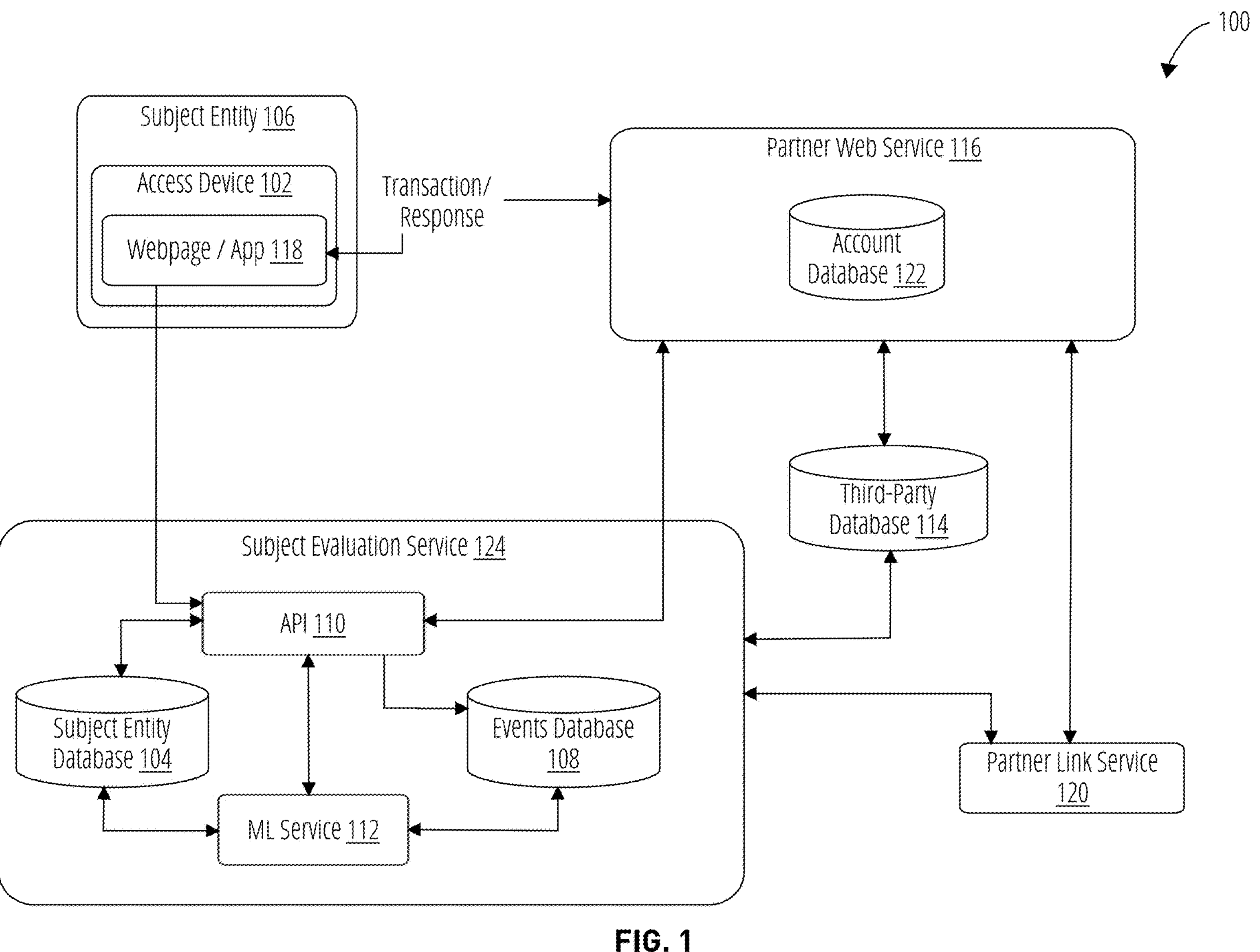
FIG. 1 illustrates an example system for predicting a projected age of a user in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Interactions between people are based on knowledge of who each party is. In physical interactions, people can verify the identity of another person. More specifically, people can utilize various different senses to determine whether the other person is who they say they are. For example, the person can look at a driver's license, ask specific questions, hear the person's voice, etc. Even if one cannot fully determine if the person is who they say they are, people can at least have a general idea of the actual person they are interacting with.

This contrasts with the digital world, where we have little insight into who avatars and accounts truly are and/or belong to. As the world becomes increasingly involved with the digital world, users are more frequently performing interactions online. For example, users regularly fill out forms online. As another example, users post content or posts on social media networks. Furthermore, users may utilize a variety of different types of devices to access these different services. For example, users use computers, mobile phones, tablets, etc.

When users interact online, service providers and other people are not able to ascertain a true identity of the user. For example, a user signing up online for an account with a clothing retail store may potentially provide a different or false identity. The clothing retail store has no way to determine whether the information provided is true.

A more malicious scenario may be a user or fraudster attempting to impersonate another person to access or set up an account for the other person. For example, a malicious user could attempt to impersonate a person to access the bank account of the person by inputting information into a form for forgotten passwords on a website of the bank. While these forms often have security questions to provide safeguards against improper access to accounts, these safeguards may fail when a malicious user has the correct answers for the security questions. Another safeguard is two-factor authentication. However, two-factor authentication is also subject to various attacks and is not a sufficient safe guard on its own.

Thus, the present technology addresses the need in the art for more information regarding a user by interpreting user idiosyncrasies as the user interacts with a service. More specifically, the present technology includes receiving event data from a user device interacting with a webpage or application of a service (e.g., via code executing on the user device and deployed on the webpage of the service). The event data is inputted into a machine learning model that is configured to derive biometric, behavioral, and habitual patterns to predict a projected age of the user. The present technology also provides solutions for identifying potentially fraudulent interactions based on the projected age, event data, and inputted data.

FIG. 1 illustrates an example network environment 100 for utilizing a subject evaluation service 124 to assist a partner web service 116 to evaluate transactions by a subject entity 106 utilizing the partner web service 116.

FIG. 1 illustrates an example network environment 100, in which a subject entity 106 utilizes an access device 102 to access a partner web service 116 associated with a partner web service 116 (e.g., a merchant, provider, payment processor, financial institution, crypto exchange, crypto wallet, etc.). In some embodiments, the partner web service 116 has a webpage/app 118 (application (app) or webpage) loaded and executing on the access device 102. The webpage/app 118 associated with the partner web service 116 can include code to report various events to API 110 of subject evaluation service 124. In some instances, the webpage/app 118 can report the events directly to API 110, and in some cases, the webpage/app 118 can report the events through partner web service 116. As will be described further herein, the events that are reported to API 110 of subject evaluation service 124 are useful in providing additional insight into the transaction regarding the likelihood that the subject entity 106 is a fraudulent party that is attempting to conduct the transaction, or other insight pertaining to the subject entity 106.

Subject entities 106 can include individuals and entities that conduct transactions. More specifically, subject entities 106 can perform or conduct on-chain transactions, off-chain transactions, and traditional transactions. On-chain transactions are transactions that occur on a blockchain that are reflected on a distributed, public ledger. On-chain transactions are typically validated and authenticated and lead to an update to the overall blockchain network. For example, a subject entity 106 may purchase a cryptocurrency on a crypto exchange. Off-chain transactions are transactions that occur outside of a blockchain. For example, a subject entity 106 may purchase a cryptocurrency wallet from another person, such that the value of the cryptocurrency is transferred to the subject entity 106, but the blockchain does not identify the transaction. Traditional transactions are transactions that are unrelated to blockchains, such as a credit card transaction at a merchant, depositing a check, an Automated Cleaning House (ACH) transaction to move money from one account to another, etc. For example, a subject entity 106 may purchase clothing with a credit card or debit card on a third-party website (e.g., a partner web service 116) that is associated with or otherwise connected to network environment 100.

Partner web services 116 are applications, websites, and/or services for entities or platforms (e.g., merchants, service providers, payment processors, financial institutions, crypto exchanges, crypto wallets, etc.) associated with or otherwise connected to network environment 100. For example, merchants typically have a website (e.g., a partner web service 116) that people can purchase goods or access services. As another example, people typically use a website or crypto exchange service to trade cryptocurrency.

Partner web service 116 can be in communication with various databases and services. For example, partner web service 116 can have access to one or more databases maintained by partner web service 116, such as, for example, an account database 122 that stores user profiles and other account information associated with respective subject entities 106. Partner web service 116 can also communicate with and access one or more third-party databases 114 such as credit reporting databases, people search databases, social network databases, etc., to access additional information pertinent to the services provided by partner web service 116.

In some embodiments, network environment 100 can be useful to connect partner web service 116 to subject evaluation service 124 to evaluate the subject entity attempting to conduct a transaction with partner web service 116. Subject evaluation service 124 can perform its functions for many partner web services 116, and as such, it can aggregate information about the subject entity 106 as the subject entity interacts with the partner web services 116 across the Internet. Subject evaluation service 124 can build a profile to identify subject entities using event data that is difficult for those committing fraud to impersonate. Subject evaluation service 124 can utilize transaction information from many partner web service 116 to train one or machine learning algorithms using ML service 112 to evaluate various transaction dimensions to determine whether the subject entity is authentic or is a fraudulent entity impersonating the subject entity.

Subject entity database 104 can store routine personal identifying information such as phone numbers, e-mails, SSNs, bank account numbers, credit card numbers, blockchain wallets, etc., and user behavior information such as typing dynamics, mouse control dynamics, device motion dynamics, access device identifying information, and more. In other words, subject entity database 104 can include various types of data that can identify and/or be linked to or associated with a particular user (e.g., subject entity 106).

In some embodiments, the subject evaluation service 124 can utilize the ML service 112 to train machine learning algorithms to evaluate other aspects of a transaction beyond whether a fraudulent entity is impersonating the subject entity 106. For example, the subject evaluation service 124 can include ML algorithms that are able to evaluate patterns in a subject entity's service usage to help evaluate transaction risks associated with a particular transaction involving the subject entity.

Application programming interface 110 (API 110) provides an interface between partner web service 116 and subject evaluation service 124 and is configured to receive event data from webpage/app 118. The event data can include a variety of information pertaining to aspects of how the subject entity 106 interacts with the webpage/app 118 (e.g., mouse movements, keyboard events, typing speed, movement of the device, etc.). In some aspects, the event data is pseudo-biometric data because a collection of such data can be used to generate a profile and/or a unique fingerprint that can be used to represent a particular subject entity. API 110 is configured to record various behavioral biometrics. In some embodiments, the device events can be collected and reported by a script or algorithm deployed on webpage/app 118 that communicates directly or indirectly (through partner web service 116) with API 110 of subject evaluation service 124. In some embodiments, webpage/app 118 is further configured to stream the data (for example, while a subject entity 106 is filling out a form), or in a batch (after the subject entity 106 submits the form).

Events database 108 is configured to store the data received by API 110. In some embodiments, events database 108 is further configured to communicate with ML service 112.

API 110 is configured to record biometric data (e.g., mouse movements, keyboard events, typing speed, movement of the device, etc.). In some embodiments, API 110 is called by an algorithm, script, or a software development kit (SDK) deployed on partner web service 116 and executed on or by access device 102. Additionally, API 110 is configured to asynchronously receive biometric behavioral data and/or device intelligence data. Similarly, API 110 is configured to asynchronously provide the biometric data and/or device intelligence data to events database 108. In some embodiments, API 110 is also configured to provide the data to ML service 112.

ML service 112 can be configured to receive data to train an ML model and/or to use a trained ML model to evaluate received data. More specifically, ML service 112 can be configured to receive the behavioral biometric data and/or device intelligence data from events database 108 to train the ML model or to receive data from API 110 to identify a particular user associated with the data using a trained ML model.

Subject entity database 104 can be the same database as events database 108 or separate. Subject entity database 104 can be configured to store information about a subject entity. For example, subject entity database 104 can store statistics regarding the behavioral biometric data and/or device intelligence data that might be used to identify a subject entity and/or the access devices that a subject entity regularly utilizes to access one or more services. Subject entity database 104 can also be configured to store conclusions of a trained ML algorithm pertaining to subject entity, such as a conclusion of the approximate age of the subject entity based on data defining attributes of how the subject entity moves a mouse, their typing speed dynamics, how they hold and move their hand-held device, etc.

In some embodiments, the subject evaluation service 124 might access one or more third-party database 114 or partner link service 120 to collect additional information to evaluate subject entity 106. One or more third-party databases 114 can include credit reporting databases, people search databases, social network databases, etc. The partner link service 120 can be a service that has access to one or more accounts of the subject entity 106, including accounts at web services other than the partner web service 116. Some partner link services 120 can obtain account access credentials from subject entity 106 to one or more accounts to facilitate the processing of one or more transactions on behalf of subject entity 106.

Collectively network environment 100 provides a system that facilitates a partner web service 116 to utilize evaluations made by the subject evaluation service 124 regarding the subject entity 106 to permit the partner web service 116 to decide whether to proceed with a transaction. Such evaluations might indicate that a fraudulent party is impersonating a subject entity and/or that a subject entity is attempting to perform a transaction that might come with increased risk. The subject evaluation service 124 can make these evaluations because subject evaluation service 124 tracks a subject entity and aggregates data as the subject entity performs transactions with a plurality of web services.

Figure 2A:
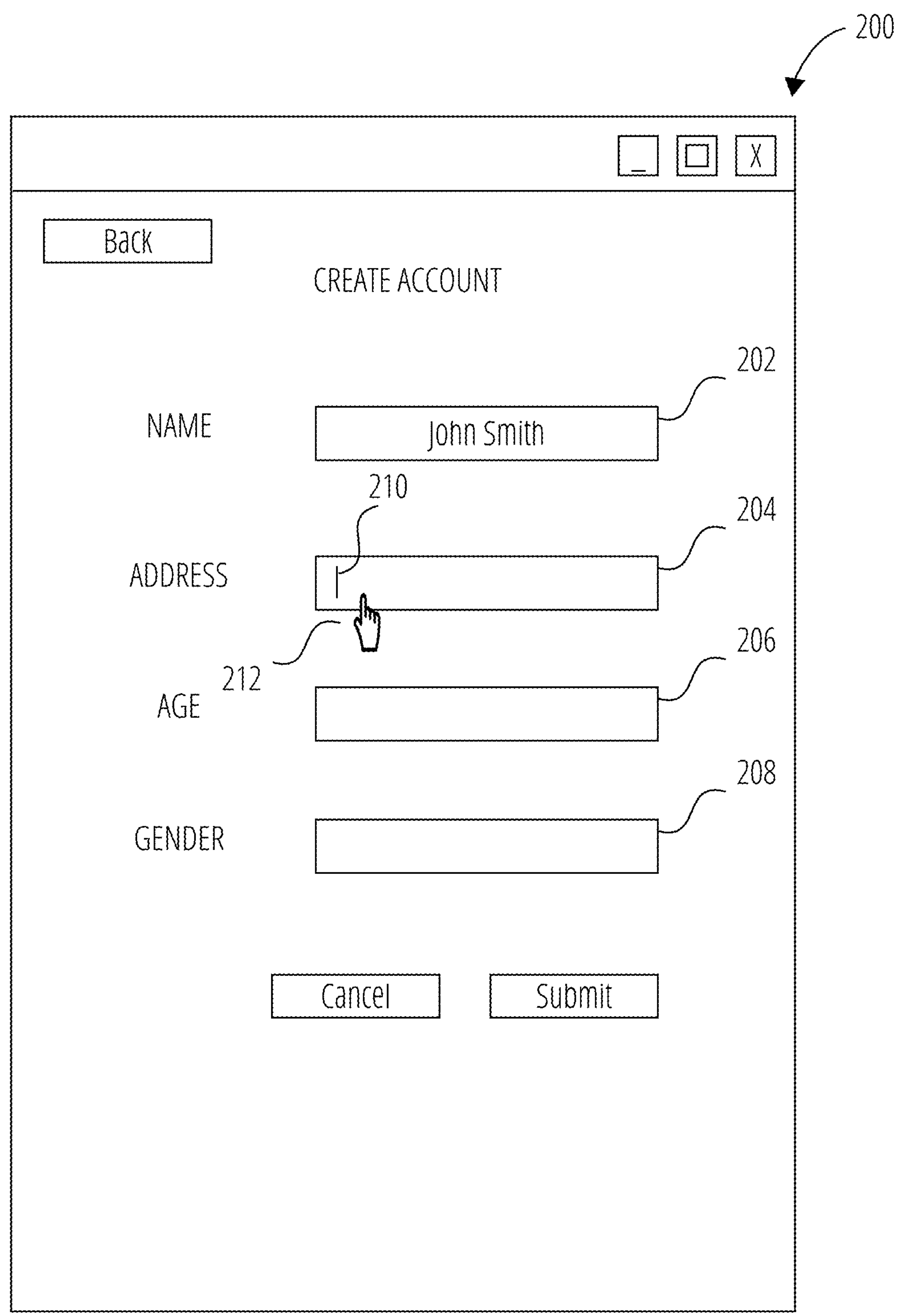
FIG. 2A illustrates an example webpage or app in accordance with some aspects of the present technology.
Figure 2B:
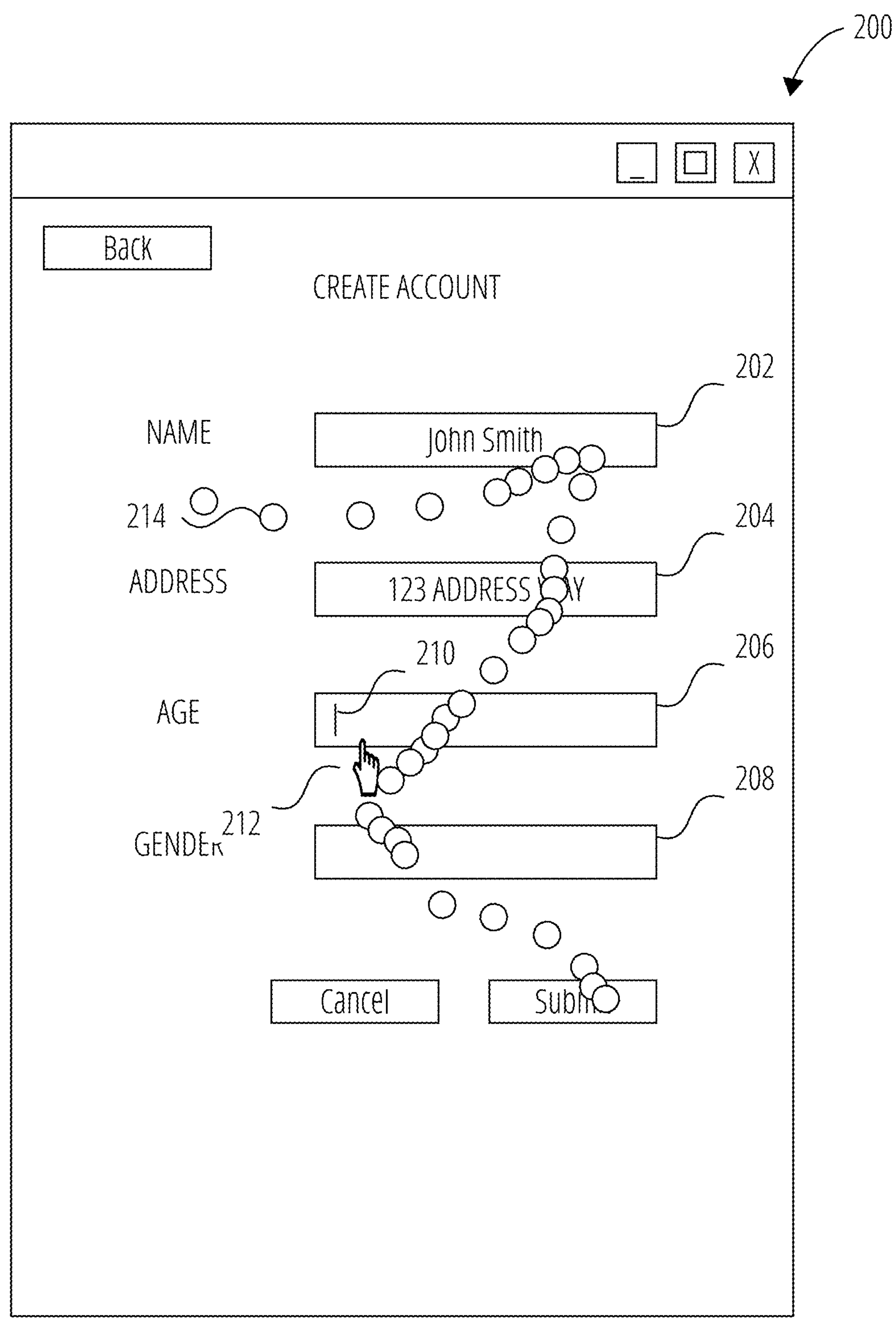
FIG. 2B illustrates an example webpage or app in accordance with some aspects of the present technology.

FIG. 2A and FIG. 2B illustrate a webpage embodiment of webpage/app 200. For example, webpage/app 200 may be webpage/app 118 of partner web service 116. More specifically, a computer or other access device (e.g., access device 102) can run or otherwise display webpage/app 200 with a graphical user interface (GUI) on a display associated with the access device.

Webpage/app 200 may have one or more fields 202, 204, 206, 208 that require input from a user (e.g., subject entity 106). On computers and other access devices (e.g., access device 102), the GUI may include a text cursor 210 and a cursor 212. A text cursor 210 is a position indicator on the display where a user can enter text. Cursor 212 is a visible and moving pointer that the user controls with a mouse, touch pad, or similar input device. As a user fills out fields 202, 204, 206, 208, the user will utilize input devices, such as a keyboard, a mouse, a keypad, etc. For example, the user will type answers into fields 202, 204, 206, 208 using a keyboard and/or keypad. Additionally, as the user completes an answer in one field (e.g., field 202), the user will switch to another field (e.g., field 204) by either pressing "tab" on the keyboard and/or moving the mouse to align cursor 212 over field 204 and click the mouse.

As discussed above, webpage/app 200 can include code, scripts, algorithms, and/or a SDK deployed thereon. The code is configured to record event data as the user utilizes the access device to interact with a GUI of webpage/app 200. Event data can include a variety of information pertaining to aspects of how the subject entity 106 interacts with the webpage/app 200. For example, event data can include, but is not limited to, x-y coordinates of cursor 212, mouse movements, mouse clicks, mouse wheel scrolls, mousepad inputs, keyboard events, key inputs, keystrokes, keypress down, keypress releases, movement of the device, etc. The event data is also referred to herein as biometric data and/or behavioral data. The event data is a collection of such data that can be used to predict an age of the subject entity accessing webpage/app 200 of partner web service 116.

For example, FIG. 2A illustrates a user that has typed an answer into field 202 using the keyboard. The code on webpage/app 200 records each individual keypress down on the keyboard with timestamps and each individual keypress release on the keyboard with timestamps. For example, FIG. 2A illustrates that the user typed or is typing "John Smith" in field 202. Thus, the code records a timestamp and a keypress down event on the shift button and the letter "J" along with another timestamp and a keypress release event of the shift button and the letter "J." The code continues to record these events for each keyboard event with respective timestamps.

FIG. 2B illustrates the user has finished typing the answer in field 204 and moves the cursor 212 to field 206. More specifically, the user moves cursor 212 from field 204 to field 206 by moving the mouse. The code on webpage/app 200 can record x-y coordinates of the cursor 212 in relation to the page along with timestamps. In some embodiments, the code can record actual movements of cursor 212. Thus, the code records a set of x-y coordinates of the cursor 212 at field 204 and a respective timestamp, another set of x-y coordinates of the cursor 212 when the cursor 212 is moved over to field 206 and the respective timestamp, and a mouse click event or clicking of the mouse when the cursor 212 is over field 206 to select field 206 for text input. The code on webpage/app 200 then continues to record the typing event data associated with inputting text into field 206 (e.g., keypress down, keypress release, timestamps, etc.).

For example, FIG. 2B illustrates a mouse trail 214 over webpage/app 200. In some embodiments, the mouse trail 214 may not be visible to the user, but the data of mouse trail 214 can still be recorded despite not being displayed to the user. Mouse trail 214 is a set of coordinates associated with a timestamp. For example, each dot in mouse trail 214 can represent a timestamp and x-y coordinate of where the cursor 212 is on the display at a particular time. In other words, each dot illustrates an example measurement or packet of data that captures some event (e.g., movement of the mouse). Thus, as these timestamps and x-y coordinates are aggregated, they form mouse trail 214.

In some embodiments, webpage/app 200 can directly send the points and timestamps of mouse trail 214 directly to ML service 112. In some embodiments, webpage/app 200 can process the data (e.g., timestamps and x-y coordinates) into refined information, such as velocity, jitter, hesitation percentage, and other behavioral biometrics, and send the processed or refined information to the subject evaluation service 124 and/or ML service 112.

As discussed above, webpage/app 200 can include code to report various events to an API (e.g., API 110 of subject evaluation service 124). In some instances, the webpage/app 200 can report the events directly to the API, and in some cases, the webpage/app 200 can report the events through the service associated with webpage/app 200 (e.g., partner web service 116). In some embodiments, the code can asynchronously send the recorded data to a database (e.g., events database 108) and/or a machine learning model (e.g., a machine learning model deployed on ML service 112).

Figure 2C:
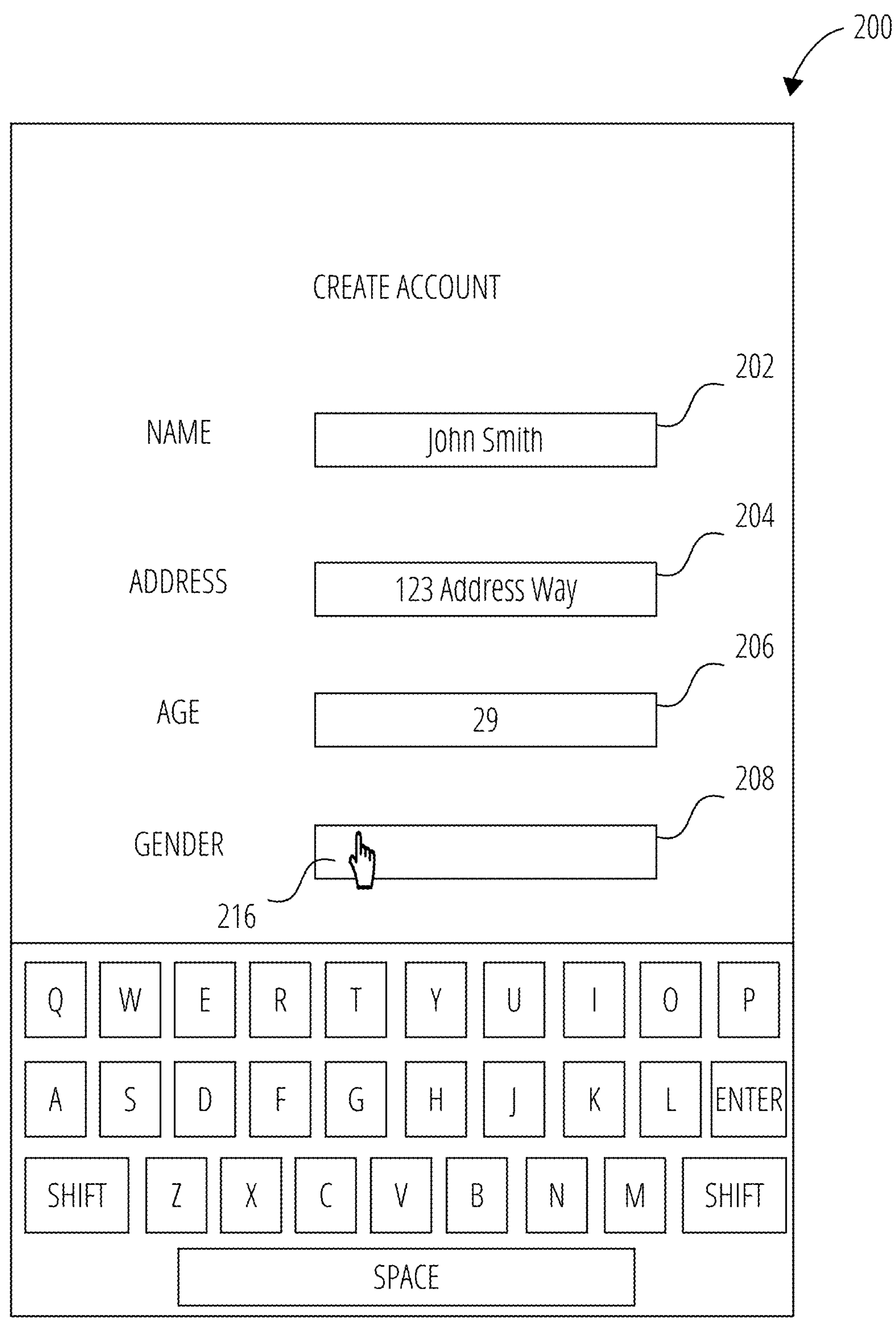
FIG. 2C illustrates an example webpage or app in accordance with some aspects of the present technology.

FIG. 2C illustrates an application embodiment of webpage/app 200. For example, webpage/app 200 may be webpage/app 118 of partner web service 116. More specifically, an access device (e.g., access device 102) of the user can include a touchscreen device including, but not limited to, a smartphone, a tablet, a laptop, a touchscreen computer, a mobile device, and other touchscreen devices. The access device can run or otherwise display webpage/app 200 with a GUI on a touchscreen display of the access device.

Webpage/app 200 may have one or more fields 202, 204, 206, 208 that require input from a user (e.g., subject entity 106). The touchscreen display of the access device is configured to receive touch inputs 216 when the user touches the device. For example, FIG. 2C illustrates that the user has typed answers in fields 202, 204, and 206. FIG. 2C further illustrates a touch input 216 at field 208. In other words, the user has tapped the area of the display where the GUI displays field 208. Webpage/app 200 is configured to record the touch input 216, the location of the touch input 216, and a timestamp for the touch input 216.

In some embodiments, the access device is a mobile device that includes other sensors and webpage/app 200 is configured to record and/or receive sensor data from sensors of the mobile device. For example, modern smartphones now have accelerometers and gyroscopes that are configured to record sensor data that is indicative of motion and tilt of the smartphone. More specifically, gyroscopes are configured to measure tilt or rotation around one or more spatial axes. Accelerometers are configured to measure acceleration or change in velocity of the mobile device. Accordingly, webpage/app 200 (e.g., via the code running thereon) is configured to record measurements of rotation and changes in velocity of the mobile device. For example, some users may prefer to hold the phone lower and angle the phone at approximately a 45 degree angle respective to the ground. Other users may prefer to hold the phone higher and angle the phone near perpendicular to the ground at eye level. The gyroscope of the mobile device can identify the rotational orientation and store the orientation and/or the changes relative to a frame of reference as sensor data. Webpage/app 200 (e.g., via the code deployed thereon) can record the sensor data from the gyroscope and provide the data to an evaluation service (e.g., subject evaluation service 124 via API 110) and/or a machine learning model (e.g., as deployed on ML service 112). As another example, younger users of mobile devices are able to type more quickly while keeping the mobile device more stable. On the other hand, older users of mobile devices may type slower and have shakier hands. The accelerometer can measure the movement as the users tap the mobile device to type and the jitters of the older users and store the measurements as sensor data. As discussed above, webpage/app 200 (e.g., via the code executing on the mobile device) can record the sensor data from the accelerometer and provide the data to an evaluation service (e.g, subject evaluation service 124 via API 110) and/or a machine learning model (e.g., as deployed on ML service 112).

The machine learning model (e.g., as deployed on ML service 112) is configured to receive event data of a user from a user device while the user interacts (e.g., fills out a form, presses through pages, etc.) with a GUI to access a service (e.g., webpage/app 200, webpage/app 118, partner web service 116, etc.). The machine learning model is configured to predict a projected age for the user associated with the event data based on the received or inputted event data. In some embodiments, the machine learning model can derive behavioral biometrics or pseudo behavioral biometrics from the event data. As discussed above, the event data can include timestamps, movements of a mouse, clicking of the mouse, scrolling of a scroll wheel of the mouse, mousepad inputs, x-y coordinates of a cursor associated with the mouse, a key input on a keyboard, a key stroke, a keypress down of a key on the keyboard, a keypress release of the key on the keyboard, and field switching.

The machine learning model can, for example, derive a manner or habit of switching from one field to another field (e.g., by pressing the "tab" key, by clicking into the next field, by utilizing a combination of pressing the "tab" key and clicking the next field, etc.).

As another example, the machine learning model can derive a velocity and precision of mouse movements (e.g., by analyzing x-y coordinates of cursor 212 over time). In some embodiments, the velocity and precision of mouse movements can identify jitters, hesitation, or shakiness. For example, younger users tend to have better hand-eye coordination, which results in quicker and more precise mouse movements. On the other hand, older users tend to have slower and shakier mouse movements.

As yet another example, the machine learning model can derive an amount of time spent filling out the one or more fields of a form or other input habits including, but not limited to, frequency of typographical errors, usage of copy and paste controls, usage of input support software (e.g., sticky keys, filter keys, etc.).

Additionally, the machine learning model can derive typing speed and/or method of typing (e.g., using all ten fingers, using two fingers, individual touch input 216 for typing, continuous or "gesture" touch input 216 for typing, etc.). The typing speed and/or method of typing can further differentiate between different age groups. For example, very young children often type with one finger on each hand, while adults often type with all ten fingers, which results in faster typing and minimal or no time lag between key inputs and/or keypress and releases. As another example, certain age groups may gravitate towards a particular method of touchscreen typing (e.g., adults under 50 may often utilize gesture typing, while adults over 50 may more frequently individually use touch inputs 216).

The machine learning model can predict, based on the event data and the derivations of behavioral and habitual patterns therefrom, a projected age of the user. More specifically, the machine learning model predicts, based on the event data obtained from the user device as the user interacted with the GUI of the service, a projected age of the user.

In some embodiments, the code is deployed on webpage/apps 200 of multiple different partner web services 116. Each webpage/app 200 can send event data along with other identifying data (e.g., an account stored in account database 122 of partner web service 116). For example, the user may utilize multiple different social media networks. Accordingly, each social media network can have a webpage/app 200 that includes code to record event data from the user device as the user interacts with the webpage/app 200. The machine learning model can receive the event data for the user from all of the webpage/apps 200 (e.g., additional event data) and further refine derivations and predictions based on the additional event data.

In some embodiments, the machine learning model can determine whether a current interaction is fraudulent based on the additional event data. In some embodiments, the machine learning model can determine behavioral or habitual patterns of the user. For example, the machine learning model can identify that an average typing speed of the user is approximately 40 words per minute, a habit of utilizing the keyboard rather than the mouse to navigate the webpage (e.g., by pressing "tab," "shift" and "tab," "enter," etc.). The machine learning model can compare the event data from the current interaction against the additional event data and the patterns derive therefrom. If the event data is significantly different from the identified behavioral patterns, then the machine learning model can determine that the current interaction is likely fraudulent and/or performed by a different person from the claimed user.

In some embodiments, the machine learning model can also receive inputted data. In other words, the machine learning model can receive data that the user input into fields field 202, 204, 206, 208. In some scenarios, the field may be for identifying an age of the user and the user can provide an age accordingly. The machine learning model can identify, based on the inputted age and an age prediction output (e.g., a projected or predicted age of the user), whether the interaction may be fraudulent. If the inputted age is beyond a threshold range of the predicted age, the machine learning model can flag or otherwise identify the interaction as potentially fraudulent. For example, the user may assert that the user is in an age group over 50, while the machine learning model may predict a projected age of the user to be in the early twenties. A threshold range may be within twenty years of the projected age. Thus, the user is outside of a threshold range of thirty to seventy years old. Accordingly, the machine learning model can flag that the interaction is likely being performed by a young person instead of the alleged older age. In some embodiments, the machine learning model can flag the interaction as fraudulent or otherwise require additional review or caution.

Figure 3:
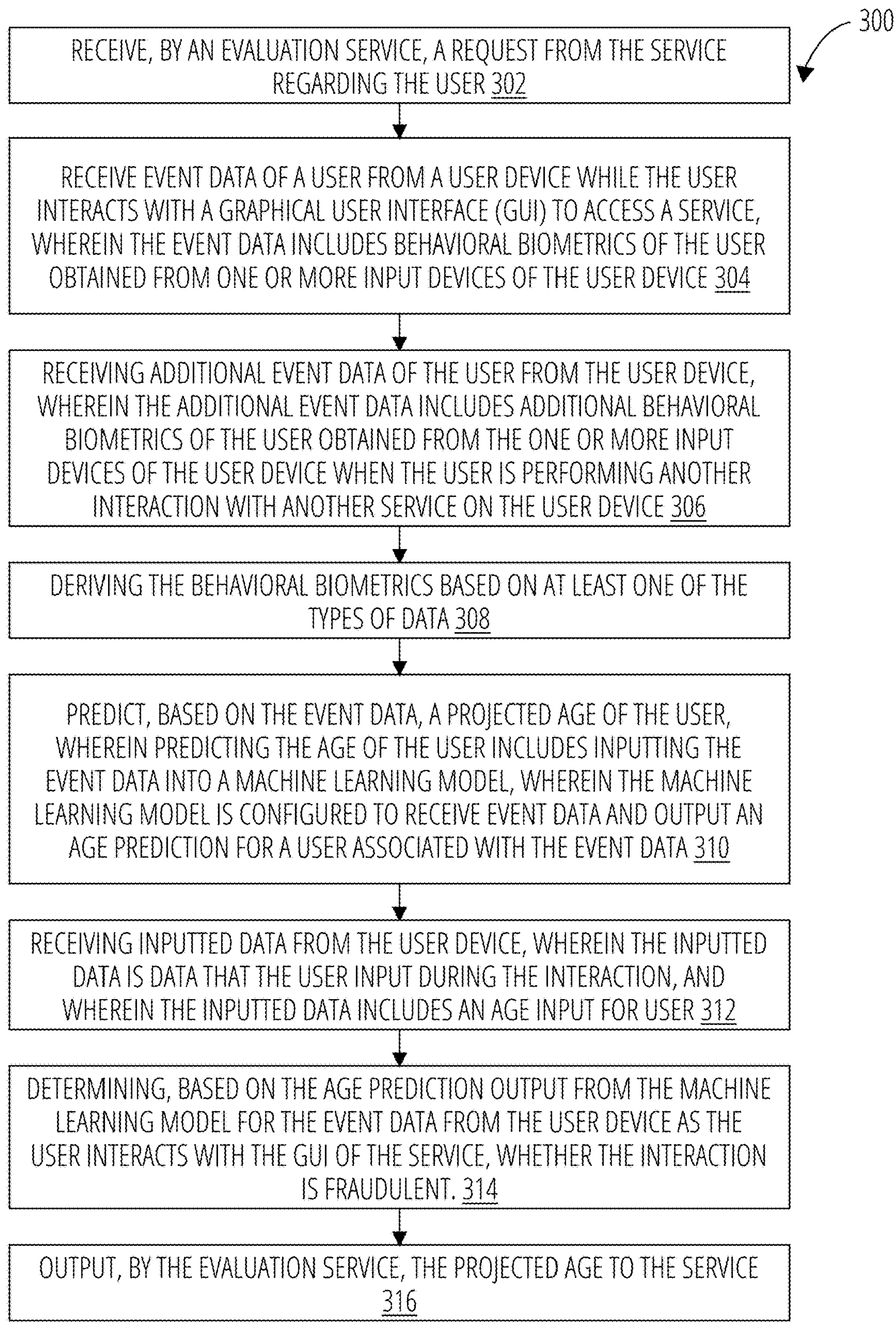
FIG. 3 illustrates an example method for predicting an age of a user based on event data obtained from input devices of a user device while the user interacts with a GUI of a service in accordance with some aspects of the present technology.

FIG. 3 illustrates an example method 300 for predicting an age of a user based on event data obtained from input devices of a user device while the user interacts with a GUI of a service. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

At step 302, method 300 includes receiving, by an evaluation service, a request from the service regarding the user. For example, API 110 and/or subject evaluation service 124 can receive a request from the service (e.g., partner web service 116) regarding the user (e.g., subject entity).

At step 304, method 300 includes receiving event data of a user from a user device while the user interacts with a graphical user interface (GUI) to access a service. For example, API 110 and/or subject evaluation service 124 can receive event data of the user from the user device while the user interacts with the GUI to access the service (e.g., partner web service 116). In some embodiments, the event data includes behavioral biometrics of the user obtained from one or more input devices of the user device. In some embodiments, the user device is a mobile device and/or a mobile phone. In some embodiments, the one or more input devices include at least one of a gyroscope and an accelerometer. In some embodiments the event data includes type of data including at least one of a timestamp, movement of a mouse, clicking of the mouse, scrolling a scroll wheel of the mouse, a mousepad input, x-y coordinates of a cursor of the mouse, a key input on a keyboard, a key stroke, a keypress down of a key on the keyboard, a keypress release of the key on the keyboard, and field switching.

At step 306, method 300 includes receiving additional event data of the user from the user device. For example, API 110 and/or subject evaluation service 124 can receive additional event data of the user from the user device. In some embodiments, the additional event data includes additional behavioral biometrics of the user obtained from the one or more input devices of the user device when the user is performing another interaction with another service on the user device. In some embodiments, the behavioral biometrics include at least one of a manner of switching from one field to another field, velocity of moving the mouse, jitter in mouse movements, typing speed, hesitation percentage, time spent filling out one or more fields of a form, input habits, and a frequency of typographic errors.

At step 308, method 300 includes deriving the behavioral biometrics based on at least one of the types of data. For example, a machine learning model of ML service 112 and/or subject evaluation service 124 can derive behavioral biometrics based on at least one type of event data. For example, a machine learning model of ML service 112 can derive behavioral biometrics, such as velocity of moving the mouse, jitter in mouse movements, hesitation percentage, etc., from event data, such as x-y coordinates of the cursor of the mouse with respective timestamps. In some embodiments, the event data can be preprocessed to derive the behavioral biometrics and the behavioral biometrics are inputted directly into the machine learning model.

At step 310, method 300 includes predicting, based on the event data, a projected age of the user. For example, a machine learning model of ML service 112 and/or subject evaluation service 124 can predict, based on the event data, a projected age of the user. In some embodiments, predicting the age of the user includes inputting the event data into a machine learning model, wherein the machine learning model is configured to receive event data and output an age prediction for a user associated with the event data.

At step 312, method 300 includes receiving inputted data from the user device. For example, API 110 and/or subject evaluation service 124 can receive inputted data from the user device. In some embodiments, the inputted data is data that the user input during the interaction, and wherein the inputted data includes an age input for user.

At step 314, method 300 includes determining, based on the age prediction output from the machine learning model, whether the interaction is fraudulent. For example, subject evaluation service 124 can determine, based on the age prediction output from the machine learning model for the event data from the user device as the user interacts with the GUI of the service, whether the interaction is fraudulent. In some embodiments, determining whether the interaction is fraudulent is further based on whether the event data matches the additional event data. In some embodiments, determining whether the interaction is fraudulent is further based on whether the projected age is within a threshold range of the age input for the user and/or if the age input for the user is within a threshold range of the projected age. Thus, the present technology provides additional information that facilitates identifying whether the user performing the interaction is actually the person that the user claims to be.

At step 316, method 300 includes outputting, by the evaluation service, the projected age to the service. For example, subject evaluation service 124 can output the projected age to the service (e.g., partner web service 116). In some embodiments, outputting the projected age is performed together with providing the determination of whether the interaction is fraudulent. For example, subject evaluation service 124 can provide an output indicating that the interaction is likely fraudulent because the projected age of the user is likely in their twenties, but the user account is for someone in their fifties.

Figure 4:
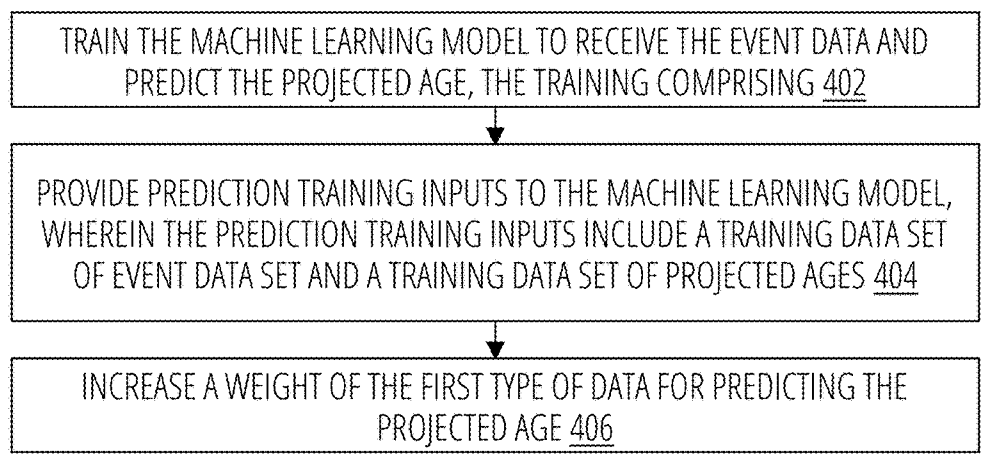
FIG. 4 illustrates an example method training a machine learning algorithm to receive event data of a user from a user device and predict, based on the event data, a projected age of the user in accordance with some aspects of the present technology.

FIG. 4 illustrates an example method 400 for training a machine learning algorithm to receive event data of a user from a user device while the user interacts with a GUI to access a service and predict, based on the event data obtained while the user interacts with the GUI, a projected age of the user. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

At step 402, method 400 includes training the machine learning model to receive the event data and predict the projected age. For example, subject evaluation service 124 and/or ML service 112 can train the machine learning model to receive the event data and predict the projected age.

At step 404, method 400 includes providing prediction training inputs to the machine learning model. For example, subject evaluation service 124 and/or ML Service 112 can provide prediction training inputs to the machine learning model (e.g., from events database 108, API 110, webpage/app 118, webpage/apps 200, and/or partner web service 116). In some embodiments, the prediction training inputs include a training data set of event data set and a training data set of projected ages. In some embodiments, the data includes one or more different types of data. A first type of data can have a higher variance than a second type of data and, consequently, the second type of data can have a lower variance than the first type of data.

At step 406, method 400 includes increasing a weight of the first type of data for predicting the projected age. For example, subject evaluation service 124 and/or ML Service 112 can increase a weight of the first type of data for predicting the projected age. More specifically, method 400 can adjust a weight of a type of data based on a relative variance. For example, if the first type of data has a higher variance than the second type of data, method 400 can increase a weight of the first type of data or decrease a weight of the second type of data. As another example, if the second type of data falls below a threshold variance, then method 400 can remove the second type of data.

It is further considered that partner web service 116 can provide additional feedback regarding the actual age of the user. Subject evaluation service 124 and/or ML service 112 can utilize the additional feedback to continuously train the machine learning model.

Figure 5:
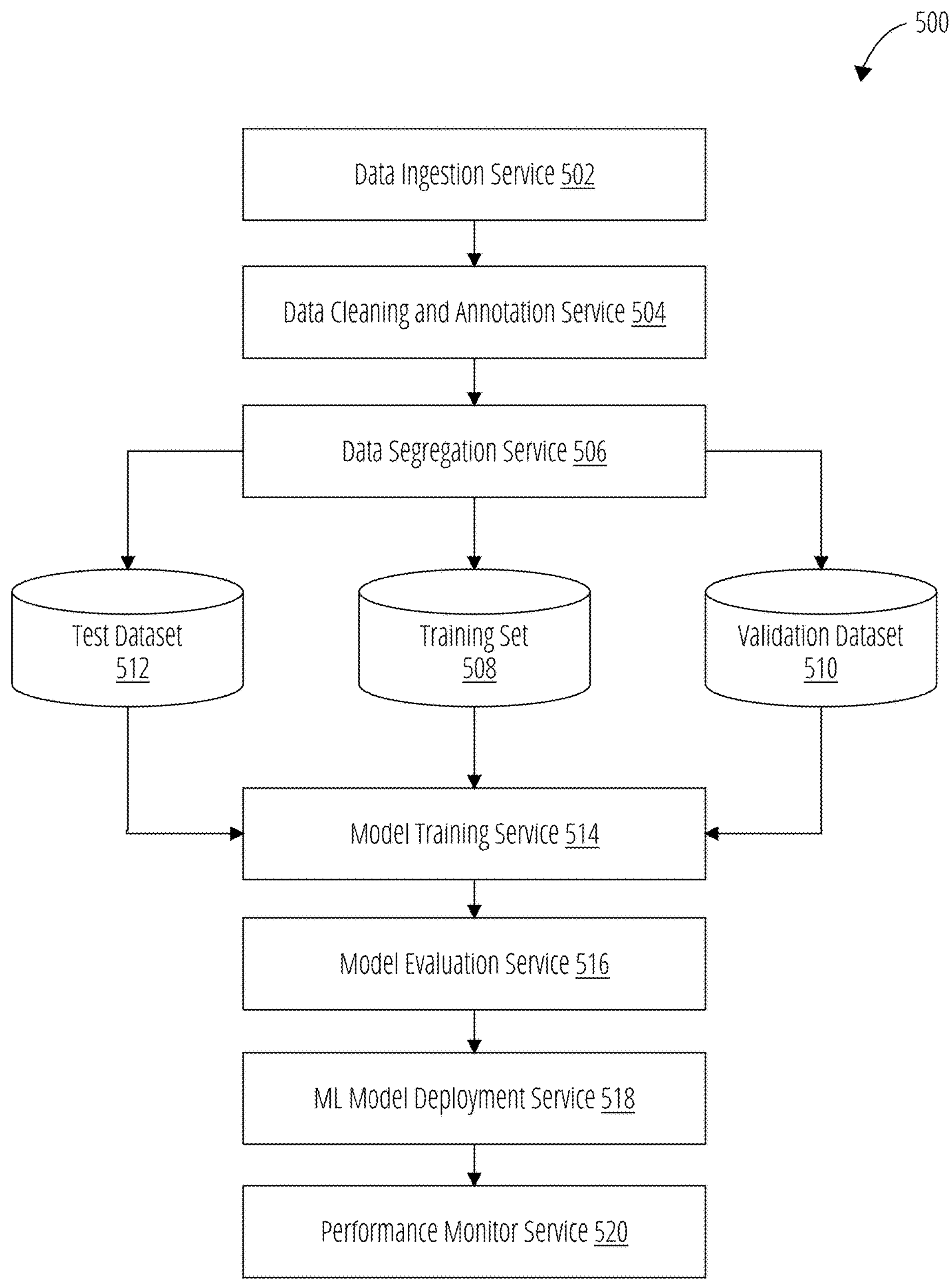
FIG. 5 illustrates a method for training a machine learning model in accordance with some aspects of the present technology.

FIG. 5 illustrates an example lifecycle 500 of a ML model in accordance with some examples. The first stage of the lifecycle 500 of a ML model is a data ingestion service 502 to generate datasets described below. ML models require a significant amount of data for the various processes described in FIG. 5 and the data persisted without undertaking any transformation to have an immutable record of the original dataset. The data can be provided from third party sources such as publicly available dedicated datasets. The data ingestion service 502 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data from the consumer of the data (e.g., an ML model training pipeline). For offline data production, when source data is available from the producer, the producer publishes a message and the data ingestion service 502 retrieves the data. In some examples, the data ingestion service 502 may be online and the data is streamed from the producer in real-time for storage in the data ingestion service 502.

After data ingestion service 502, a data preprocessing service preprocesses the data to prepare the data for use in the lifecycle 500 and includes at least data cleaning, data transformation, and data selection operations. The data cleaning and annotation service 504 removes irrelevant data (data cleaning) and general preprocessing to transform the data into a usable form. The data cleaning and annotation service 504 includes labelling of features relevant to the ML model. In some examples, the data cleaning and annotation service 504 may be a semi-supervised process performed by a ML to clean and annotate data that is complemented with manual operations such as labeling of error scenarios, identification of untrained features, etc.

After the data cleaning and annotation service 504, data segregation service 506 to separate data into at least a training set 508, a validation dataset 510, and a test dataset 512. Each of the training set 508, a validation dataset 510, and a test dataset 512 are distinct and do not include any common data to ensure that evaluation of the ML model is isolated from the training of the ML model.

The training set 508 is provided to a model training service 514 that uses a supervisor to perform the training, or the initial fitting of parameters (e.g., weights of connections between neurons in artificial neural networks) of the ML model. The model training service 514 trains the ML model based a gradient descent or stochastic gradient descent to fit the ML model based on an input vector (or scalar) and a corresponding output vector (or scalar).

After training, the ML model is evaluated at a model evaluation service 516 using data from the validation dataset 510 and different evaluators to tune the hyperparameters of the ML model. The predictive performance of the ML model is evaluated based on predictions on the validation dataset 510 and iteratively tunes the hyperparameters based on the different evaluators until a best fit for the ML model is identified. After the best fit is identified, the test dataset 512, or holdout data set, is used as a final check to perform an unbiased measurement on the performance of the final ML model by the model evaluation service 516. In some cases, the final dataset that is used for the final unbiased measurement can be referred to as the validation dataset and the dataset used for hyperparameter tuning can be referred to as the test dataset.

After the ML model has been evaluated by the model evaluation service 516, an ML model deployment service 518 can deploy the ML model into an application or a suitable device. The deployment can be into a further test environment such as a simulation environment, or into another controlled environment to further test the ML model.

After deployment by the ML model deployment service 518, a performance monitor service 520 monitors for performance of the ML model. In some cases, the performance monitor service 520 can also record additional transaction data that can be ingested via the data ingestion service 502 to provide further data, additional scenarios, and further enhance the training of ML models.

Figure 6:
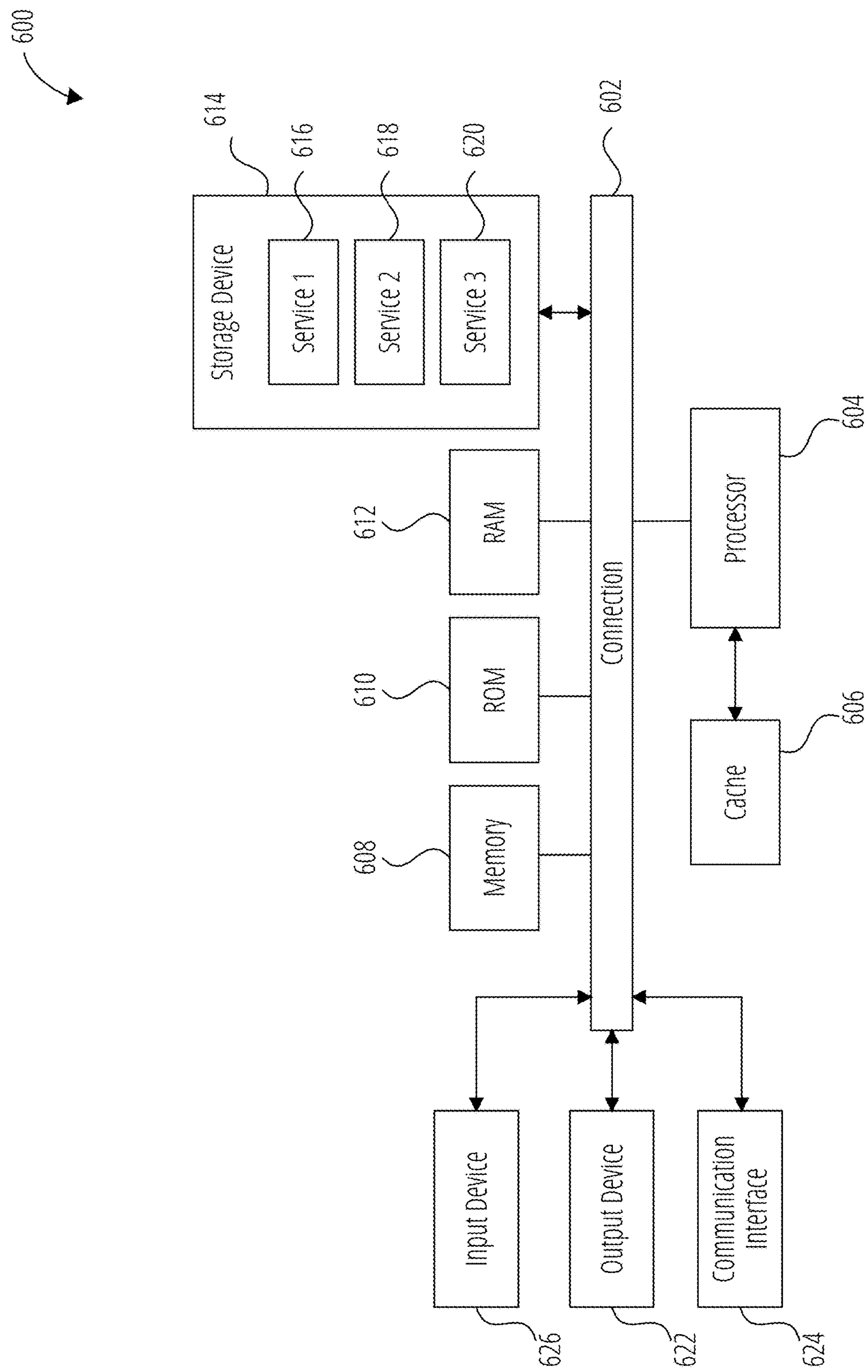
FIG. 6 shows an example of a system for implementing certain aspects of the present technology.

FIG. 6 shows an example of computing system 600, which can be for example any computing device making up access device 102, partner web service 116, partner link service 120, subject evaluation service 124, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A computer-implemented method comprising: receiving event data of a user from a user device while the user interacts with a graphical user interface (GUI) to access a service, wherein the event data includes behavioral biometrics of the user obtained from one or more input devices of the user device; and predicting, based on the event data, a projected age of the user, wherein predicting the age of the user includes inputting the event data into a machine learning model, wherein the machine learning model is configured to receive event data and output an age prediction for a user associated with the event data.

Aspect 2. The computer-implemented method of Aspect 1, further comprising: determining, based on the age prediction output from the machine learning model for the event data from the user device as the user interacts with the GUI of the service, whether the interaction is fraudulent.

Aspect 3. The computer-implemented method of any of Aspects 1 to 2, further comprising: receiving, by an evaluation service, a request from the service regarding the user; and outputting, by the evaluation service, the projected age to the service.

Aspect 4. The computer-implemented method of any of Aspects 1 to 3, further comprising: receiving additional event data of the user from the user device, wherein the additional event data includes additional behavioral biometrics of the user obtained from the one or more input devices of the user device when the user is performing another interaction with another service on the user device, wherein determining whether the interaction is fraudulent is further based on whether the event data matches the additional event data.

Aspect 5. The computer-implemented method of any of Aspects 1 to 4, further comprising: receiving inputted data from the user device, wherein the inputted data is data that the user input during the interaction, and wherein the inputted data includes an age input for user, and wherein determining whether the interaction is fraudulent is further based on whether the projected age is within a threshold range of the age input for the user.

Aspect 6. The computer-implemented method of any of Aspects 1 to 5, wherein the user device is a mobile phone, and wherein the one or more input devices include at least one of a gyroscope and an accelerometer.

Aspect 7. The computer-implemented method of any of Aspects 1 to 6, wherein the event data includes types of data including at least one of a timestamp, movement of a mouse, clicking of the mouse, scrolling a scroll wheel of the mouse, a mousepad input, x-y coordinates of a cursor of the mouse, a key input on a keyboard, a key stroke, a keypress down of a key on the keyboard, a keypress release of the key on the keyboard, and field switching.

Aspect 8. The computer-implemented method of any of Aspects 1 to 7, further comprising: deriving the behavioral biometrics based on at least one of the types of data.

Aspect 9. The computer-implemented method of any of Aspects 1 to 8, wherein the behavioral biometrics include at least one of a manner of switching from one field to another field, velocity of moving the mouse, jitters, typing speed, hesitation percentage, time spent filling out one or more fields of a form, input habits, and a frequency of typographic errors.

Aspect 10. The computer-implemented method of any of Aspects 1 to 9, further comprising: training the machine learning model to receive the event data and predict the projected age, the training comprising: providing prediction training inputs to the machine learning model, wherein the prediction training inputs include a training data set of event data set and a training data set of projected ages.

Aspect 11. The computer-implemented method of any of Aspects 1 to 10, wherein the event data includes one or more different types of data, and wherein a first type of data has a higher variance than a second type of data and the second type of data has a lower variance than the first type of data, and wherein training the machine learning model further comprises: increasing a weight of the first type of data for predicting the projected age.

Aspect 12. A system includes a storage (implemented in circuitry) configured to store instructions and a processor. The processor configured to execute the instructions and cause the processor to: receive event data of a user from a user device while the user interacts with a graphical user interface (GUI) to access a service, wherein the event data includes behavioral biometrics of the user obtained from one or more input devices of the user device; and predict, based on the event data, a projected age of the user, wherein predicting the age of the user includes inputting the event data into a machine learning model, wherein the machine learning model is configured to receive event data and output an age prediction for a user associated with the event data.

Aspect 13. The system of Aspect 12, wherein the instructions further cause the processor to: determine, based on the age prediction output from the machine learning model for the event data from the user device as the user interacts with the GUI of the service, whether the interaction is fraudulent.

Aspect 14. The system of any of Aspects 12 to 13, wherein the instructions further cause the processor to: receive, by an evaluation service, a request from the service regarding the user; and output, by the evaluation service, the projected age to the service.

Aspect 15. The system of any of Aspects 12 to 14, wherein the instructions further cause the processor to: receive additional event data of the user from the user device, wherein the additional event data includes additional behavioral biometrics of the user obtained from the one or more input devices of the user device when the user is performing another interaction with another service on the user device, wherein determining whether the interaction is fraudulent is further based on whether the event data matches the additional event data.

Aspect 16. The system of any of Aspects 12 to 15, wherein the instructions further cause the processor to: receive inputted data from the user device, wherein the inputted data is data that the user input during the interaction, and wherein the inputted data includes an age input for user, and wherein determining whether the interaction is fraudulent is further based on whether the projected age is within a threshold range of the age input for the user.

Aspect 17. The system of any of Aspects 12 to 16, wherein the user device is a mobile phone, and wherein the one or more input devices include at least one of a gyroscope and an accelerometer.

Aspect 18. The system of any of Aspects 12 to 17, wherein the event data includes types of data including at least one of a timestamp, movement of a mouse, clicking of the mouse, scroll a scroll wheel of the mouse, a mousepad input, x-y coordinates of a cursor of the mouse, a key input on a keyboard, a key stroke, a keypress down of a key on the keyboard, a keypress release of the key on the keyboard, and field switching.

Aspect 19. The system of any of Aspects 12 to 18, wherein the instructions further cause the processor to: derive the behavioral biometrics based on at least one of the types of data.

Aspect 20. The system of any of Aspects 12 to 19, wherein the behavioral biometrics include at least one of a manner of switching from one field to another field, velocity of moving the mouse, jitters, typing speed, hesitation percentage, time spent filling out one or more fields of a form, input habits, and a frequency of typographic errors.

Aspect 21. The system of any of Aspects 12 to 20, wherein the instructions further cause the processor to: train the machine learning model to receive the event data and predict the projected age, the training comprising: provide prediction training inputs to the machine learning model, wherein the prediction training inputs include a training data set of event data set and a training data set of projected ages.

Aspect 22. The system of any of Aspects 12 to 21, wherein the event data includes one or more different types of data, and wherein a first type of data has a higher variance than a second type of data and the second type of data has a lower variance than the first type of data, and wherein training the machine learning model further comprises: increase a weight of the first type of data for predicting the projected age.

Aspect 23. A non-transitory computer readable medium comprising instructions, which when executed by a computing system, cause the computing system to: receive event data of a user from a user device while the user interacts with a graphical user interface (GUI) to access a service, wherein the event data includes behavioral biometrics of the user obtained from one or more input devices of the user device; and predict, based on the event data, a projected age of the user, wherein predicting the age of the user includes inputting the event data into a machine learning model, wherein the machine learning model is configured to receive event data and output an age prediction for a user associated with the event data.

Aspect 24. The computer readable medium of Aspect 23, wherein the instructions, when executed by the computing system, further cause the computing system to: determine, based on the age prediction output from the machine learning model for the event data from the user device as the user interacts with the GUI of the service, whether the interaction is fraudulent.

Aspect 25. The computer readable medium of any of Aspects 23 to 24, wherein the instructions, when executed by the computing system, further cause the computing system to: receive, by an evaluation service, a request from the service regarding the user; and output, by the evaluation service, the projected age to the service.

Aspect 26. The computer readable medium of any of Aspects 23 to 25, wherein the instructions, when executed by the computing system, further cause the computing system to: receive additional event data of the user from the user device, wherein the additional event data includes additional behavioral biometrics of the user obtained from the one or more input devices of the user device when the user is performing another interaction with another service on the user device, wherein determining whether the interaction is fraudulent is further based on whether the event data matches the additional event data.

Aspect 27. The computer readable medium of any of Aspects 23 to 26, wherein the instructions, when executed by the computing system, further cause the computing system to: receive inputted data from the user device, wherein the inputted data is data that the user input during the interaction, and wherein the inputted data includes an age input for user, and wherein determining whether the interaction is fraudulent is further based on whether the projected age is within a threshold range of the age input for the user.

Aspect 28. The computer readable medium of any of Aspects 23 to 27, wherein the user device is a mobile phone, and wherein the one or more input devices include at least one of a gyroscope and an accelerometer.

Aspect 29. The computer readable medium of any of Aspects 23 to 28, wherein the event data includes types of data including at least one of a timestamp, movement of a mouse, clicking of the mouse, scroll a scroll wheel of the mouse, a mousepad input, x-y coordinates of a cursor of the mouse, a key input on a keyboard, a key stroke, a keypress down of a key on the keyboard, a keypress release of the key on the keyboard, and field switching.

Aspect 30. The computer readable medium of any of Aspects 23 to 29, wherein the instructions, when executed by the computing system, further cause the computing system to: derive the behavioral biometrics based on at least one of the types of data.

Aspect 31. The computer readable medium of any of Aspects 23 to 30, wherein the behavioral biometrics include at least one of a manner of switching from one field to another field, velocity of moving the mouse, jitters, typing speed, hesitation percentage, time spent filling out one or more fields of a form, input habits, and a frequency of typographic errors.

Aspect 32. The computer readable medium of any of Aspects 23 to 31, wherein the instructions, when executed by the computing system, further cause the computing system to: train the machine learning model to receive the event data and predict the projected age, the training comprising: provide prediction training inputs to the machine learning model, wherein the prediction training inputs include a training data set of event data set and a training data set of projected ages.

Aspect 33. The computer readable medium of any of Aspects 23 to 32, wherein the event data includes one or more different types of data, and wherein a first type of data has a higher variance than a second type of data and the second type of data has a lower variance than the first type of data, and wherein training the machine learning model further comprises: increase a weight of the first type of data for predicting the projected age.

What is claimed is:

1. A computer-implemented method comprising:

receiving event data associated with an interaction with a graphical user interface (GUI) of a first service of a first service platform, wherein the interaction is associated with a user profile, wherein the event data includes behavioral biometrics obtained from one or more input devices of a user device associated with the user profile;

receiving additional event data associated with a second interaction with a GUI of a second service of a second service platform, wherein the additional event data includes additional behavioral biometrics; and predicting, based on the event data, a projected age of a user of the user device, wherein predicting the projected age of the user includes inputting the event data into a machine learning model, wherein the machine learning model is configured to receive the event data and output the projected age for the user.

2. The computer-implemented method of claim 1, further comprising:

determining, based on the projected age outputted from the machine learning model for the event data, whether the interaction is fraudulent.

3. The computer-implemented method of claim 2, wherein determining whether the interaction is fraudulent is further based on whether the event data matches the additional event data.

4. The computer-implemented method of claim 1, further comprising:

receiving, by an evaluation service, a request from the first service regarding the user; and outputting, by the evaluation service, the projected age to the first service.

5. The computer-implemented method of claim 1, further comprising:

receiving inputted data from the user device, wherein the inputted data is data that the user input during the interaction, and wherein the inputted data includes an age input for the user, wherein determining whether the interaction is fraudulent is further based on whether the projected age is within a threshold range of the age input for the user.

6. The computer-implemented method of claim 1, wherein the user device is a mobile phone, and wherein the one or more input devices include at least one of a gyroscope and an accelerometer.

7. The computer-implemented method of claim 1, wherein the event data includes types of data including at least one of a timestamp, movement of a mouse, clicking of the mouse, scrolling a scroll wheel of the mouse, a mousepad input, x-y coordinates of a cursor of the mouse, a key input on a keyboard, a key stroke, a keypress down of a key on the keyboard, a keypress release of the key on the keyboard, and field switching.

8. A non-transitory computer-readable medium storing instructions thereon, wherein the instructions, when executed by one or more processors, cause the one or more processors to:

receive event data associated with an interaction with a graphical user interface (GUI) of a first service of a first service platform, wherein the interaction is associated with a user profile, wherein the event data includes behavioral biometrics obtained from one or more input devices of a user device associated with the user profile;

receive additional event data associated with a second interaction with a GUI of a second service of a second platform, wherein the additional event data includes additional behavioral biometrics; and predict, based on the event data, a projected age of a user of the user device, wherein predicting the projected age of the user includes inputting the event data into a machine learning model, wherein the machine learning model is configured to receive the event data and output the projected age for the user.

9. The non-transitory computer-readable medium of claim 8, wherein the instructions, when executed by the one or more processors, further cause the one or more processors to:

determine, based on the projected age outputted from the machine learning model for the event data, whether the interaction is fraudulent.

10. The non-transitory computer-readable medium of claim 9, wherein determining whether the interaction is fraudulent is further based on whether the event data matches the additional event data.

11. The non-transitory computer-readable medium of claim 8, wherein the instructions, when executed by the one or more processors, further cause the one or more processors to:

receive, by an evaluation service, a request from the first service regarding the user; and output, by the evaluation service, the projected age to the first service.

12. The non-transitory computer-readable medium of claim 8, wherein the instructions, when executed by the one or more processors, further cause the one or more processors to:

receive inputted data from the user device, wherein the inputted data is data that the user input during the interaction, and wherein the inputted data includes an age input for the user, wherein determining whether the interaction is fraudulent is further based on whether the projected age is within a threshold range of the age input for the user.

13. The non-transitory computer-readable medium of claim 8, wherein the user device is a mobile phone, and wherein the one or more input devices include at least one of a gyroscope and an accelerometer.

14. The non-transitory computer-readable medium of claim 8, wherein the event data includes types of data including at least one of a timestamp, movement of a mouse, clicking of the mouse, scrolling a scroll wheel of the mouse, a mousepad input, x-y coordinates of a cursor of the mouse, a key input on a keyboard, a key stroke, a keypress down of a key on the keyboard, a keypress release of the key on the keyboard, and field switching.

15. A system comprising:

a processor; and a non-transitory memory storing computer-executable instructions thereon, wherein the computer-executable instructions, when executed by the processor, cause the processor to:

receive event data associated with an interaction with a graphical user interface (GUI) of a first service of a first service platform, wherein the interaction is associated with a user profile, wherein the event data includes behavioral biometrics obtained from one or more input devices of a user device associated with the user profile;

receive additional event data associated with a second interaction with a GUI of a second service of a second service platform, wherein the additional event data includes additional behavioral biometrics; and predict, based on the event data, a projected age of a user of the user device, wherein predicting the projected age of the user includes inputting the event data into a machine learning model, wherein the machine learning model is configured to receive the event data and output the projected age for the user.

16. The system of claim 15, wherein the computer-executable instructions, when executed by the processor, further cause the processor to:

determine, based on the projected age outputted from the machine learning model for the event data, whether the interaction is fraudulent.

17. The system of claim 16, wherein determining whether the interaction is fraudulent is further based on whether the event data matches the additional event data.

18. The system of claim 15, wherein the computer-executable instructions, when executed by the processor, further cause the processor to:

receive, by an evaluation service, a request from the first service regarding the user; and output, by the evaluation service, the projected age to the first service.

19. The system of claim 15, wherein the computer-executable instructions, when executed by the processor, further cause the processor to:

receive inputted data from the user device, wherein the inputted data is data that the user input during the interaction, and wherein the inputted data includes an age input for the user, wherein determining whether the interaction is fraudulent is further based on whether the projected age is within a threshold range of the age input for the user.

20. The system of claim 15, wherein the user device is a mobile phone, and wherein the one or more input devices include at least one of a gyroscope and an accelerometer.

* * * * *